United States Patent
Herbenar

[11] 3,945,737
[45] Mar. 23, 1976

[54] PIVOT JOINT
[75] Inventor: Edward J. Herbenar, Detroit, Mich.
[73] Assignee: TRW Inc., Cleveland, Ohio
[22] Filed: Nov. 27, 1974
[21] Appl. No.: 527,755

[52] U.S. Cl. .................... 403/27; 403/37; 403/132
[51] Int. Cl.[2]. B25G 3/00; F16D 1/00; F16G 11/00; F16C 11/00
[58] Field of Search ......... 403/58, 90, 113, 39, 114, 403/40, 115, 37, 132, 133, 135, 146, 143, 27

[56] References Cited
UNITED STATES PATENTS

| | | | |
|---|---|---|---|
| 2,527,787 | 10/1950 | Berger | 403/39 |
| 3,089,717 | 5/1963 | Gair | 403/132 |
| 3,262,706 | 7/1966 | Hassan | 403/39 X |
| 3,408,124 | 10/1968 | Melton et al. | 403/133 X |
| 3,561,800 | 2/1971 | Hassan | 403/132 X |
| 3,574,369 | 4/1971 | Andrew | 403/132 |

FOREIGN PATENTS OR APPLICATIONS

| | | | |
|---|---|---|---|
| 661,986 | 7/1938 | Germany | 403/132 |
| 198,811 | 10/1965 | Sweden | 403/133 |

Primary Examiner—Werner H. Schroeder
Assistant Examiner—Wayne L. Shedd
Attorney, Agent, or Firm—Hill, Gross, Simpson, Van Santen, Steadman, Chiara & Simpson

[57] ABSTRACT

A pivot joint or socket assembly, especially suited for use at the pitman or idler arm ends of centerlinks or in the pitman or idler arm assemblies of centerlink type steering linkages, has a pin or stud and a socket or housing forming a linkage connection which will provide rotational movement about an axis that may be tilted to a limited degree to accept variations in the linkage alignment and has a resilient wear take-up bushing which will compensate for wear and maintain the joint components in good bearing relationship throughout a long wear life.

9 Claims, 7 Drawing Figures

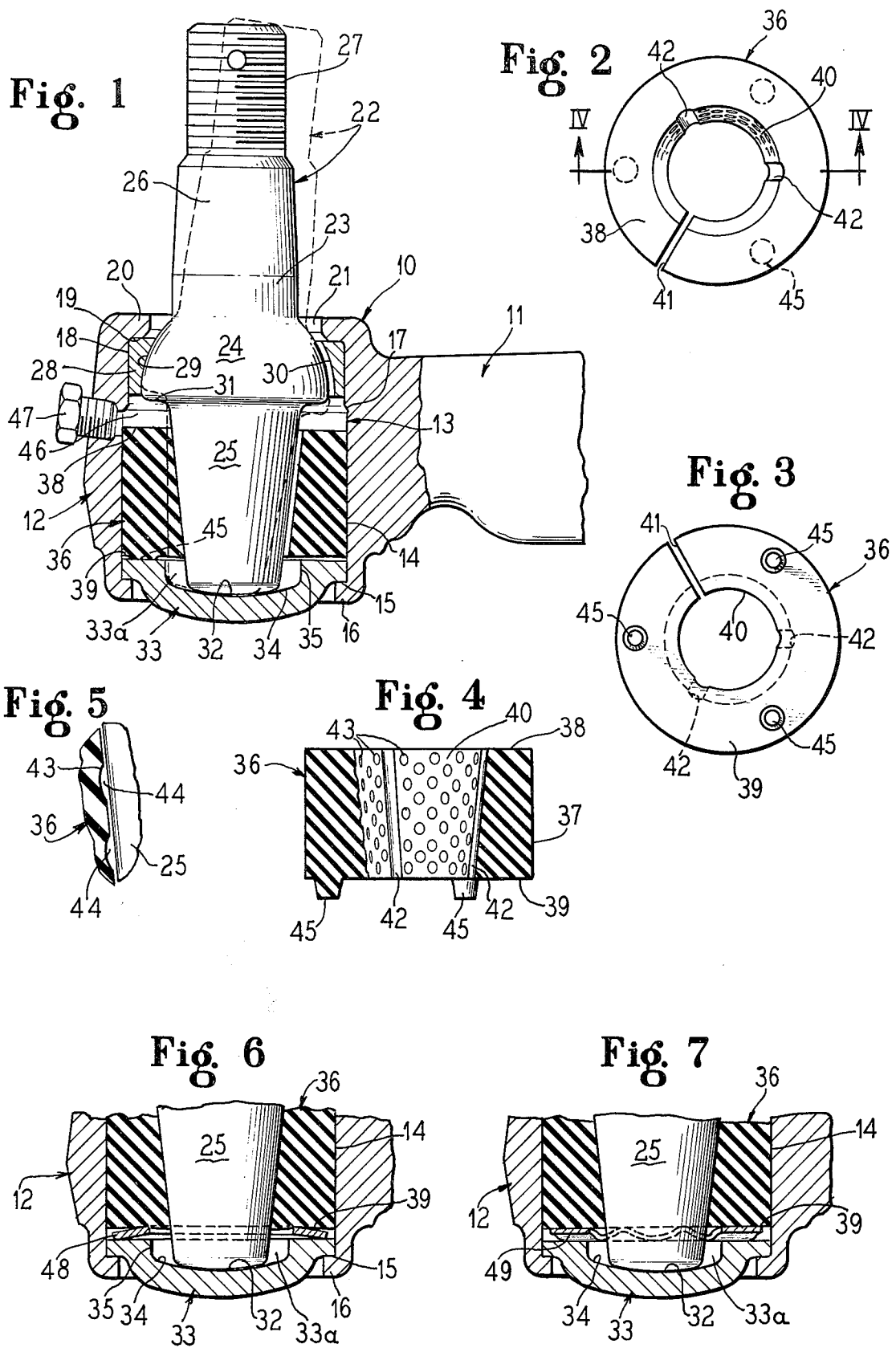

PIVOT JOINT

FIELD OF THE INVENTION

This invention relates to the art of pivot joints which also accommodate a limited degree of tilting and specifically deals with pivot joints for steering linkages of automotive vehicles which will maintain a fixed pivot axis while accommodating tilting of the axis to accept tolerance variations in a linkage, such as in idler arms or pitman arms of centerlink type steering assemblies.

PRIOR ART

My U.S. Letters Pat. No. 3,790,195, granted Feb. 5, 1974, discloses and claims a stud joint for rotational movement where the stud has a head tilting and rotating on a partially spherical seat and a pin portion depending from the head rotatable in a bushing carried by a resilient ring and having an end flange thrusting against the stud head. While this joint will provide a pivot support for idler arms, pitman arms and the like in steering linkages it does not have radial wear take-up capacity, the limiting of its tilting range is not positively controlled and a bushing is required between the stud and resilient ring.

SUMMARY OF THE PRESENT INVENTION:

The present invention now eliminates the heretofore required bushing of my aforesaid U.S. Pat. No. 3,790,195, compensates for radial wear, and positively controls the tilting range of the stud in a pivot joint suitable for idler arms and pitman arms in centerlink steering linkages for automotive vehicles. According to the invention a housing provides a socket receiving a rigid bearing member having a part spherical inter bearing wall, a resilient axially split bushing ring with a tapered bore and a recessed closure member. A stud has a shank extending freely through the end of the housing opposite the closure member with a half ball head tiltably and rotatably seated in the part spherical surface of the bearing ring and an elongated tapered pin portion depending from the head through the resilient bushing and bottomed on the closure plate. The bore of the bushing and the pin portion of the stud have mating tapers converging toward the closure plate.

Wear take-up spring means between the closure plate and resilient bushing urge the bushing toward the stud head so that the bushing will slide toward the divergent end of the tapered pin as wear develops and thereby maintain good bearing contact with the pin and prevent looseness from developing in the joint.

The tapered bore of the bushing may have a myriad of dimples therein forming pockets to trap grease, and grease grooves may be provided axially through the bushing to cooperate with a gap between the split ends of the bushing for feeding lubricant to the pockets.

The wear take-up spring means may be in the form of integral projections on the end face of the resilient bushing which are flattened by the closure plate or by a conical or wavespring washer flattened between the bushing and closure plate. The spring means in attempting to reclaim its unstressed height will urge the resilient bushing toward the divergent end of the pin and a gap is provided in the housing between the bearing ring and bushing to accommodate axial shifting of the bushing. A grease plug or lubricant fitting may be provided on the housing to supply lubricant to the components, preferably in the gap between the bearing ring and bushing.

The recess of the closure plate receiving the end of the pin portion of the stud has a surrounding upstanding shoulder or rim engaged by the end of the pin portion of the stud to limit the range of tilting of the stud.

The stud is freely rotatable in the bearing ring and bushing providing a good pivot support for the housing or for a linkage member attached to the stud and the stud can tilt within the range permitted by the closure cap to accommodate the pivot axis to the linkage parts connected by the joint.

It is then an object of this invention to provide a pivot joint of the type disclosed in my aforesaid U.S. Pat. No. 3,790,195 with less parts and having radial wear take-up.

Another object of the invention is to provide a pivot joint for automotive steering linkages and the like with a pin type stud rotatable in a resilient bushing which is spring urged into constant bearing engagement with both the stud and the housing of the joint.

Another object of the invention is to provide a pivot joint with the stud having a head tiltable in a rigid bearing, a tapered pin portion extending from the head seated in a split resilient bushing and wear take-up means urging the bushing toward the head to maintain full bearing engagement of the bushing with the pin.

Another object of the invention is to provide a pivot joint having a housing with a part spherical bearing seat at one end thereof, a recessed closure cap secured in the other end thereof, a stud having a shank projecting freely into the housing with a head tiltable on the seat and a tapered pin depending from the head and bottomed on the closure plate together with an axially split rubber bushing surrounding the pin and snugly seated in the housing, wear take-up means between the closure plate and bushing urging the bushing toward the head of the stud, and means surrounding the recess of the closure plate limiting the tilting of the stud on the bearing seat.

Another object of the invention is to provide a pivot joint with a freely rotatable stud that can tilt through a limited range having a spring urged resilient wear take-up bearing surrounding the pin and provided with dimples receiving grease to lubricate the pin for free rotation.

Other and further objects of the invention will be apparent to those skilled in this art from the following detailed description of the annexed sheet of drawings which, by way of examples, illustrates several embodiments of the invention.

IN THE DRAWINGS:

FIG. 1 is a vertical sectional view, with parts in elevation, of a pivot joint according to this invention and illustrating in dotted lines the range of tilting of the joint stud.

FIG. 2 is a top plan view of the axially split resilient bushing for the joint of FIG. 1.

FIG. 3 is a bottom plan view of the bushing of FIG. 2.

FIG. 4 is a vertical section of the bushing taken along the line IV—IV of FIG. 2.

FIG. 5 is an enlarged fragmentary detail of the dimpled bore of the bushing and the pin portion of the stud to illustrate lubrication of the stud.

FIG. 6 is a fragmentary sectional view of the lower portion of FIG. 1 but showing another form of wear take-up spring according to this invention.

FIG. 7 is a view similar to FIG. 6 but showing still another form of wear take-up spring according to this invention.

DESCRIPTION OF THE PREFERRED EMBODIMENTS:

The pivot joint 10 of FIG. 1 includes a stem or arm member 11 with a cylindrical end 12 having a stepped cylindrical bore 13 therethrough. The stepped bore 13 has an elongated large diameter cylindrical bore portion 14 extending from a shoulder 15 provided by an inturned lip 16 on the bottom end of the housing to an internal shoulder 17 converging to a small diameter bore portion 18 which extends to a shoulder 19 provided by an inturned rim 20 at the top of the housing surrounding a reduced opening 21.

A stud 22 has a cylindrical shank 23 fitting freely in the opening 21, a half ball head 24 fitting freely in the bore 18 and a tapered pin 25 depending from the head 24 and fitting freely in the bore 14. The cylindrical shank 23 extends outwardly to a tapered shank portion 26 which converges to a reduced diameter externally threaded portion 27 at the top end of the stud. The tapered shank 26 is adapted to be wedge fitted in the eye of a link or mounting and held there by a nut threaded on the portion 27.

The half ball portion 24 of the stud 22 is surrounded by a rigid bearing ring 28 seated in the bore portion 18 against the shoulder 19 and having a part spherical inner seating surface 29 mating with the ball head 24 in tilting and rotating relationship therewith. The spherical seat 29 has grease grooves such as 30 therein to distribute grease to the head 25. The bearing ring 28 may be press fitted in the bore 18 in fixed engagement therewith and may be composed of steel, hard plastic material or the like providing a rigid seat for the ball head 24.

The ball head 24 has a substantially flat radial bottom 31 merging into the divergent top end of the tapered pin portion 25 which converges from this end or shoulder 31 to a rounded bottom 32.

A rigid closure disk or cap 33 is snugly seated in the lower end of the bore portion 14 on the shoulder 15 provided by the inturned lip 16 and has a central recess 33a in the top thereof with a rounded bottom 34 slidably supporting the rounded bottom end 32 of the pin 25 and surrounded by an upstanding cylindrical shoulder or rim 35 limiting the range of tilting of the stud 22 in the housing as illustrated by the dotted lines.

An axially split cylindrical resilient bushing 36 is seated in the bore portion 14 around the pin portion 25 above the closure disk 33 and below the shoulder 17.

The bushing 36 is composed of flowable resilient material with an elastic memory for reclaiming its free state condition such as rubber, polyurethane, and the like.

As shown in FIGS. 2–4, the resilient bushing 36 has a cylindrical outer periphery 37, a flat radial top wall 38 and a flat radial bottom wall 39 with a tapered bore 40 centrally therethrough converging from the top wall 38 to the bottom wall 39. The taper of the pin portion 25 of the stud seated in this bore 40 may vary considerably, with angles of from 5° to 15° being satisfactory, and the bore 40 should therefore have a mating taper but since the bushing is resilient a non-mating taper will conform under a load. The bushing 36 is axially split and a gap 41 is provided between the split ends in the free state condition of the bushing. Axial grease grooves 42 are also provided in the bore 40 circumferentially spaced equally from each other and from the gap 41. The bore 40 is also preferably provided with a myriad of dimples 43 forming grease pockets 44 around the pin 25 as illustrated in FIG. 5.

A plurality of protrusions 45 extend from the bottom face 39 of the bushing and preferably taper to smaller diameter flat bottom ends. The protrusions are equally spaced circumferentially around the bottom end 39 and three such protrusions are useful to provide a spring bias for urging the bushing away from the closure plate 33, as will be more fully hereinafter described.

As shown in FIG. 1, the bushing 36 fills the radial space between the major length of the pin portion 25 and the bore portion 14 with parts of the pin projecting above the top wall 38 and below the bottom wall 39 of the bushing. The closure plate 33 is pressed into the bore 14 to a depth which substantially flattens the protrusions 45 and then the lip 16 of the housing is spun over the periphery of the closure disk to provide the shoulder 15 holding the disk at the pressed-in depth in the housing. In this condition the bushing 36 is forced upwardly around the pin 25 and expanded by the pin taper into tight engagement with the bore 14.

A space 46 is provided between the top wall 38 of the bushing and the shoulder 17 between the bores 14 and 18 and under the bearing ring 28. A grease plug 47 is threaded into the side wall of the housing 12 to supply lubricant to this space. This lubricant is distributed to the bearing surfaces through the grooves 30 in the bearing ring 28 and through the gap 41 and grooves 42 in the bushing 36. The pockets 44 provided by the dimples 43 receive the grease in the bushing to keep the pin portion 25 of the stud well lubricated for free rotation of the stud.

The flattened protrusions 45, in attempting to reclaim their free state positions, will continue to bias the bushing 36 toward the shoulder 17 at the top of the bore 14 and in so doing will maintain the bore 40 of the bushing in good bearing contact around the pin 25 and will expand the periphery 37 of the bushing into full seated engagement with the housing bore 14.

As shown in FIG. 1, the grease plug 47 is threaded in a bore in the sidewall of the housing which intersects the space 46 permitting either visual or mechanical gauging of permissible wear of the joint components as indicated by the axial extent of the space 46 between the upper bearing 28 and the lower bushing 36.

In a first modification of the invention shown in FIG. 6, wherein parts corresponding with parts described in FIGS. 1–5 have been marked with the same reference numerals, a conical or Belleville spring washer 48 is provided between the closure disk 33 and the bottom wall 39 of the bushing 36 to provide the spring bias provided by the protrusions 45 of the FIGS. 1–5 embodiment.

A second modification, shown in FIG. 7, wherein parts corresponding with parts described in connection with FIGS. 1–5 have been marked with the same reference numerals, illustrates the use of a wave washer 49 between the closure disk 33 and the bottom end 39 of the bushing 36 to provide the spring bias.

From the above descriptions it should be clearly understood that this invention provides a pivot joint having a freely rotatable stud which can tilt to accept misalignment of parts connected by the joint, which eliminates heretofore considered necessary parts and which provides for wear take-up to insure a long wear life.

I claim as my invention:

1. A pivot joint which comprises a housing having a bore therethrough with a reduced opening at one end thereof, a closure plate closing the opposite end of the bore having a recess surrounded by an upstanding abutment wall, a stud having a shank portion projecting freely through the reduced opening of the housing, a half ball head portion in the housing adjacent the reduced opening, a tapered pin portion converging from the central portion of the head into the recess of the closure plate and a rounded bottom end portion on the pin riding on the bottom of the recess of the closure plate, a rigid bearing ring in said housing bottomed at the reduced opening thereof having a ball seat tiltably and rotatably receiving the half ball head portion of the stud, an axially split resilient bushing in the housing surrounding the tapered pin portion of the stud in mated engagement with the pin and housing and terminating in spaced relation from said rigid bearing to provide a wear take-up space in the housing, and spring means between the closure plate and resilient bushing biasing said bushing into said wear take-up space toward the divergent end of the pin portion of the stud maintaining the bushing in bearing contact around the pin portion of the stud and around the bore of the housing and maintaining the head of the stud in seated engagement with the rigid bearing ring whereby the stud can tilt on said seat on a fixed center through an angle limited by the abutment wall of the recess engaging the pin portion of the stud and will rotate on the seat and in the bushing on a fixed center.

2. The joint of claim 1 wherein the spring means are projections on the bushing flattened by the closure plate.

3. The joint of claim 1 wherein the spring means is a spring washer between the bushing and closure plate.

4. The joint of claim 1 wherein the bushing has a dimpled bore receiving the pin portion of the stud providing lubricant pockets to supply lubricant to the pin portion.

5. A pivot joint which comprises a housing, a stud having a partial ball head portion and a pin portion in said housing with a shank portion projecting from the housing, said pin portion extending from the central portion of the head portion coaxially with the shank portion of the stud, a rigid bearing seat in the housing tiltably and rotatably supporting the stud, a resilient bushing in the housing surrounding the pin portion of the stud in mated engagement with both the housing and the pin portion and terminating in axially spaced relation from said rigid bearing seat to provide a wear take-up space in the housing between said bushing and said seat, a closure member in the housing bottomed against the end of the pin portion of the stud and holding the stud head portion on the bearing seat, and said closure member forcing said resilient bushing into said wear take-up space thereby loading the resilient bushing around the pin portion of the stud to take up wear between the bushing and stud and urging the stud head against the said bearing seat to maintain a fixed tilting and rotating center for the stud.

6. The joint of claim 5 wherein the bushing is axially split, the pin portion of the stud is tapered toward the closure member and wear take up spring means are provided between the closure member and bushing to axially bias the bushing toward the divergent end of the tapered pin portion expanding the bushing in the housing to maintain a tight fit between the pin and bushing and between the bushing and housing.

7. The joint of claim 5 wherein the pin portion of the stud is tapered toward the closure member and the bushing is axially split with a tapered bore receiving the pin portion.

8. The joint of claim 5 wherein the closure member has a recess surrounded by an upstanding wall receiving the pin portion of the stud to limit the degree of tilting of the stud.

9. A pivot joint which comprises a housing having a bore therethrough with a reduced opening at one end thereof, a closure plate closing the opposite end of the bore having a recess surrounded by an upstanding abutment wall, a stud having a shank projecting freely through the reduced opening of the housing, a half-ball portion in the housing adjacent the reduced opening, a tapered pin portion converging from the central portion of the head into the recess of the closure plate and riding on the bottom of said recess, a rigid bearing seat in said housing at the reduced opening thereof having a ball seating surface tiltably and rotatably receiving the ball head portion of the stud, an axially split resilient bushing in the housing in mated engagement with the pin and housing and axially spaced from the bearing seat to provide a wear take-up space between the seat and bushing, spring means between the closure plate and resilient bushing biasing said bushing into said wear take-up space to maintain the bushing in bearing contact around the pin portion of the stud and around the bore of the housing and biasing the ball head of the stud against the seating surface of the bearing and holding the stud on a fixed tilting and rotating center, said upstanding abutment wall of the closure plate engaging said pin limiting the tilting angle of the stud, said housing having a bore in the sidewall thereof intersecting said wear take-up space permitting gauging of permissible wear take-up between the bearing seat and resilient bushing, and a removable plug closing said bore in the sidewall of the housing.

\* \* \* \* \*